(12) United States Patent
Acres

(10) Patent No.: US 7,495,549 B2
(45) Date of Patent: Feb. 24, 2009

(54) INTEGRATED POWER, LIGHTING, AND INSTRUMENTATION SYSTEM FOR BICYCLES

(76) Inventor: John F. Acres, 4386 Crescent Valley Dr., Corvallis, OR (US) 97330

( * ) Notice: Subject to any disclaimer, the term of this patent is extended or adjusted under 35 U.S.C. 154(b) by 844 days.

(21) Appl. No.: 10/805,467

(22) Filed: Mar. 19, 2004

(65) Prior Publication Data
US 2004/0189722 A1 Sep. 30, 2004

Related U.S. Application Data

(60) Provisional application No. 60/458,473, filed on Mar. 28, 2003.

(51) Int. Cl.
*B60R 25/10* (2006.01)
(52) U.S. Cl. .................. 340/427; 340/425.5; 340/426.1; 340/429; 340/430; 340/432
(58) Field of Classification Search ................. 340/427, 340/425.5, 426.1, 429, 430, 432
See application file for complete search history.

(56) References Cited

U.S. PATENT DOCUMENTS 6,690,267 B2 * 2/2004 Linden et al. ............... 340/432
7,019,615 B2 * 3/2006 Denison et al. ............. 340/5.73
7,104,091 B2 * 9/2006 Kuhblank ..................... 70/18
2002/0067471 A1 6/2002 Bhat

FOREIGN PATENT DOCUMENTS

| DE | 100 41 959 A1 | 3/2001 |
| EP | 0 641 711 A1 | 3/1995 |
| EP | 1 381 021 A2 | 1/2004 |
| WO | WO 00/13319 | 3/2000 |

OTHER PUBLICATIONS

International Search Report from related PCT application.

* cited by examiner

*Primary Examiner*—Daryl C Pope
(74) *Attorney, Agent, or Firm*—Marger Johnson & McCollom, P.C.

(57) ABSTRACT

Disclosed is an electronic system for use on vehicles. Some embodiments of the system use an integrated power supply to power all of the electronic components of the electronic system. The electronic system may include various microprocessors, sensors, communication systems, displays, lights, speakers, switches, power control systems, and expansion ports.

23 Claims, 7 Drawing Sheets

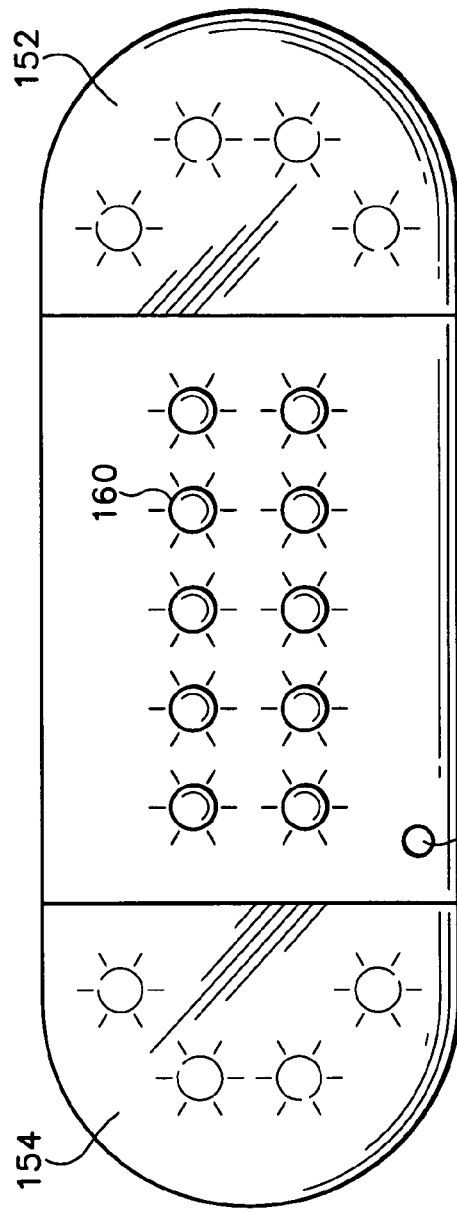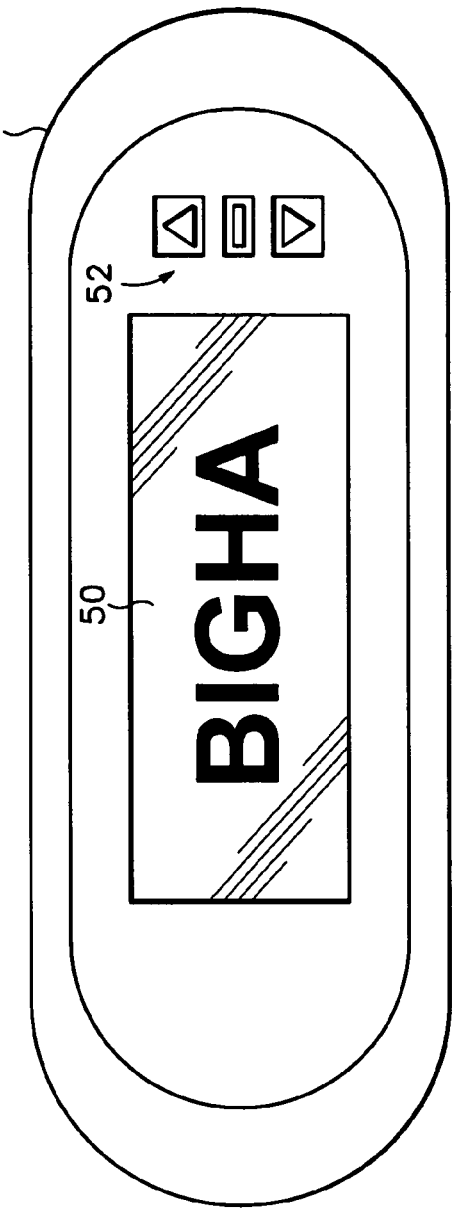
FIG.5A
FIG.5B

INTEGRATED POWER, LIGHTING, AND INSTRUMENTATION SYSTEM FOR BICYCLES

CROSS-REFERENCE TO RELATED APPLICATIONS

This application claims priority from U.S. Provisional Application Ser. No. 60/458,473, filed Mar. 28, 2003, the contents of which are expressly incorporated herein by reference in their entirety.

TECHNICAL FIELD

This disclosure relates to electronic systems for bicycles, and, more particularly, to a system of power, lighting, and instrumentation for bicycles.

BACKGROUND

Bicycles have long been used for transportation, recreation, and competition. Lighting or instrumentation (cyclometer) systems are oftentimes sold in conjunction with bicycles. Cyclometer systems indicate speed, distance traveled, altitude, etc. Typically these lighting and cyclometer systems are sold as accessories to bicycles. Because these accessories are developed to fit a wide variety of bicycles, the devices sometimes require large effort to securely mount to the bicycle. Additionally, head lights, tail lights, turn signals, electric horns and cyclometers are each designed as standalone systems and each requiring a separate battery pack or other power source. A single bicycle fitted with headlight, tail light, and cyclometer will typically carry three separate power systems along with individual on/off switches. Cabling between various electrical components and control switches is cumbersome to install, unsightly and subject to breakage.

Embodiments of the invention address these and other limitations in the prior art.

BRIEF DESCRIPTION OF THE DRAWINGS

FIGS. 5A and 5B are front and back views, respectively, of an example console component of the electrical system of FIG. 2.

DETAILED DESCRIPTION

Embodiments of the invention utilize a highly integrated combination of electrical and electronic subsystems and bicycle mechanical systems. While the following descriptions discuss power, lighting, and instrumentation on human powered two-wheeled vehicles, i.e., bicycles, the concepts disclosed herein have application on human powered or non-human powered vehicles with any number of wheels. Description of the illustrated embodiments is not limiting to the invention's application or scope.

Figure 1:
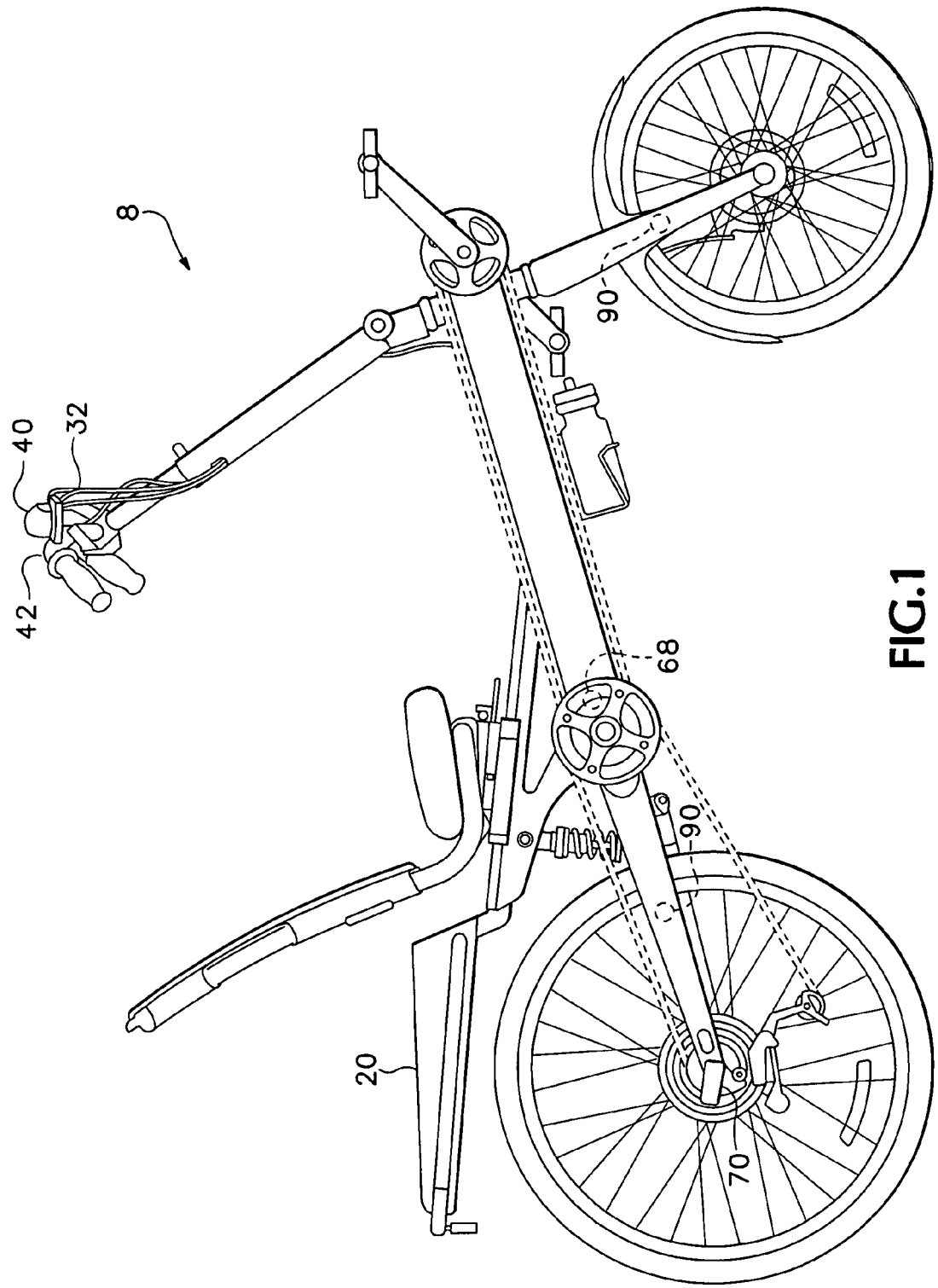
FIG. 1 is a line diagram of a bicycle incorporating an electronic system according to embodiments of the invention.
Figure 2:
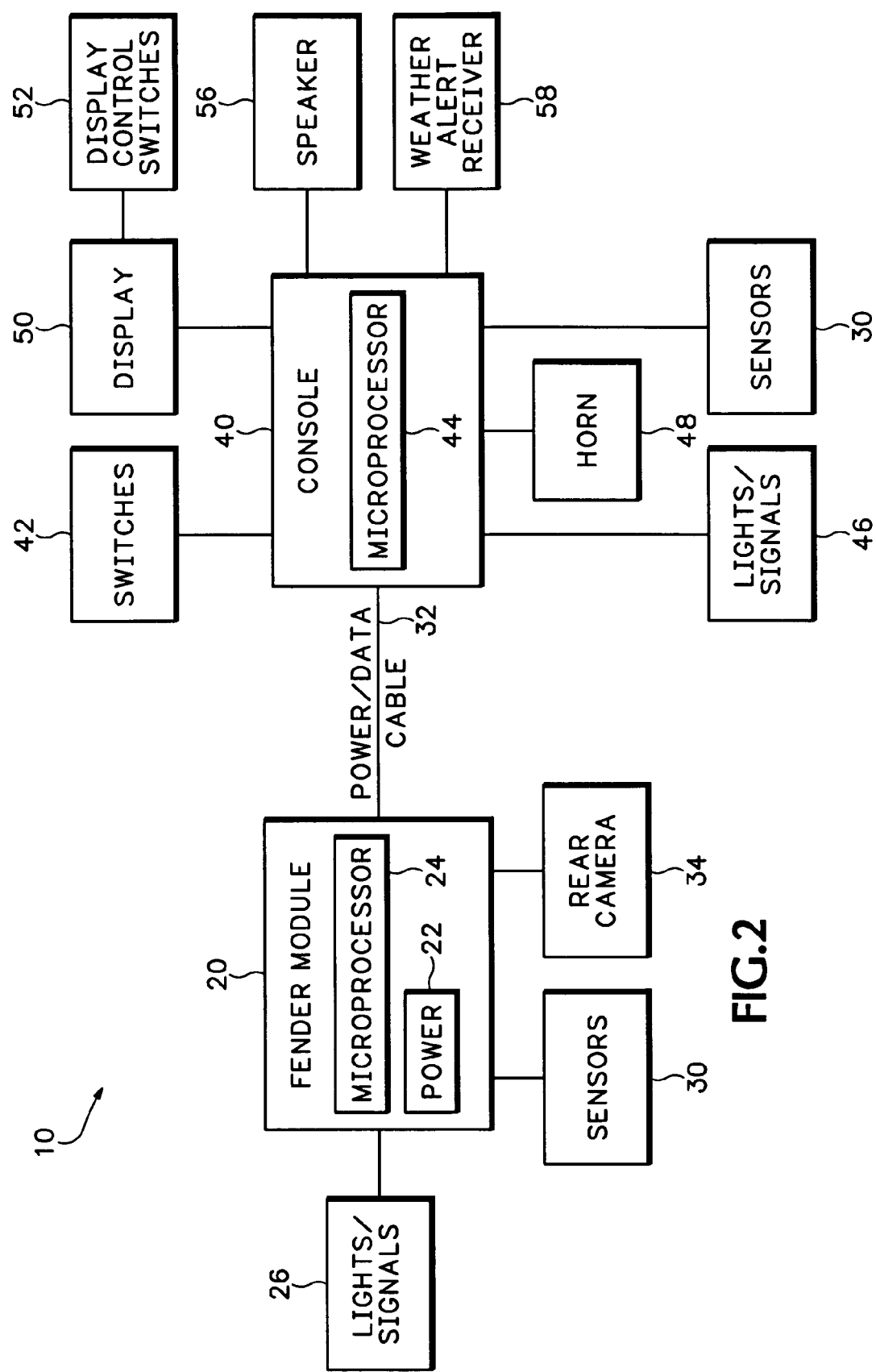
FIG. 2 is a block diagram of an electrical system used in conjunction with the bicycle of FIG. 1.

FIG. 1 is a line drawing of an example bicycle including an electrical system 10 according to embodiments of the invention. In general, a bicycle 8 is illustrated. The bicycle 8 of FIG. 1 is a self-powered recumbent style bicycle, but many aspects of the described system can work on any type of wheeled vehicle, powered or not. FIG. 2 is a block diagram illustrating example components of the electrical system 10 according to embodiments of the invention. With reference to FIGS. 1 and 2, the electrical system 10 generally includes a fender module 20 and a handlebar console 40 that are connected by a power/data cable 32. The fender module 20 includes a power supply 22 and a microprocessor 24. Lights and signals 26 are coupled to the microprocessor 24, as well as a wide array of sensors 30 and other components. Detailed description of the sensors 30 and other components follows.

The console 40 also includes a microprocessor 44. Further, switches 42, such as for operating turn lights/signals 46 and a horn 48 are coupled to the microprocessor 44. A display 50 is coupled to the microprocessor 44 and generates output for the user (bicycle rider). A set of control switches 52 allows the user to control aspects of the electrical system 10. A speaker 56 can be used for audio feedback or signaling. Also coupled to the microprocessor 44 are more sensors 30, described in detail below.

Figure 3:
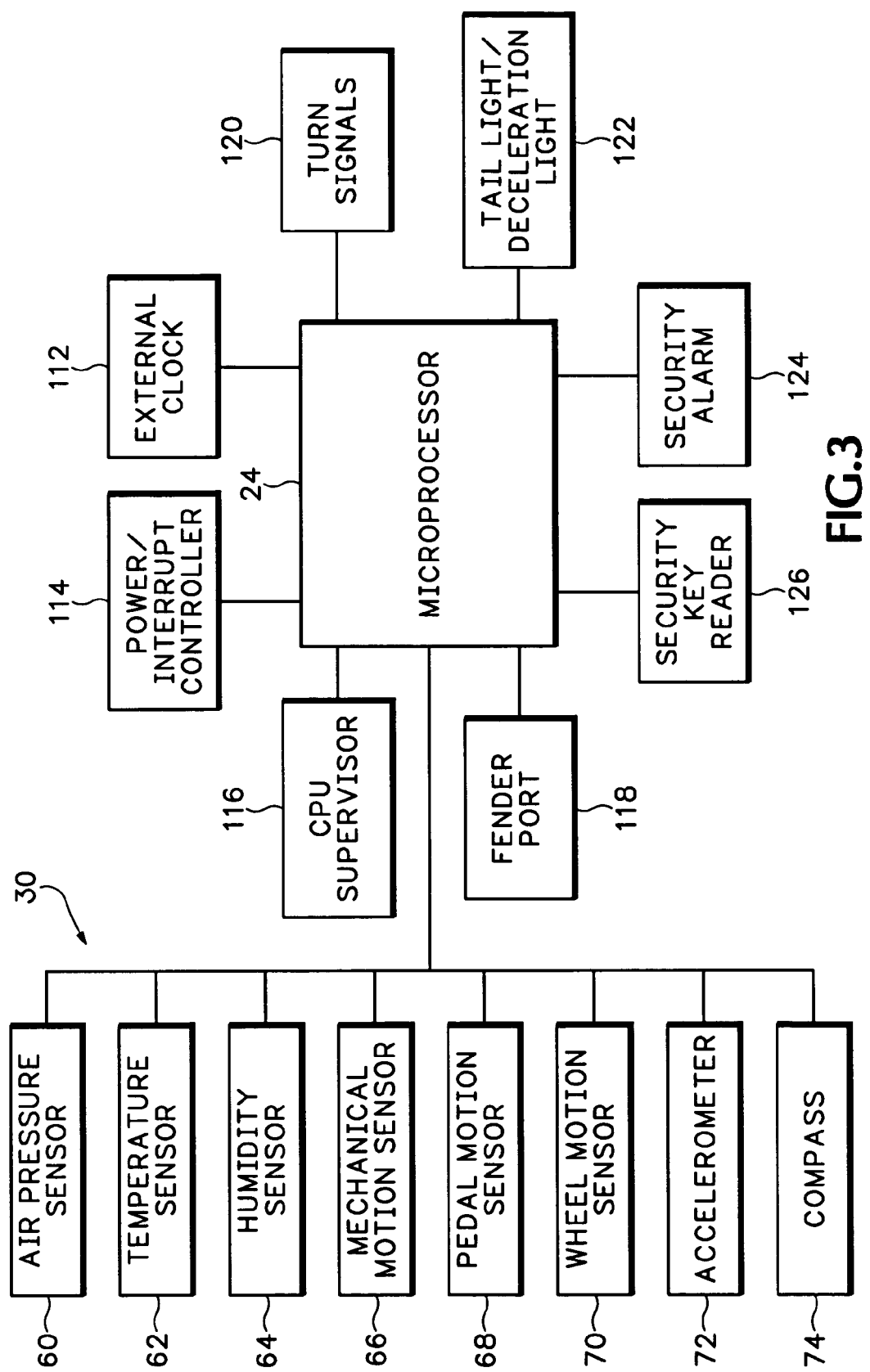
FIG. 3 is a block diagram of components of a first part of the electrical system of FIG. 2.
Figure 4:
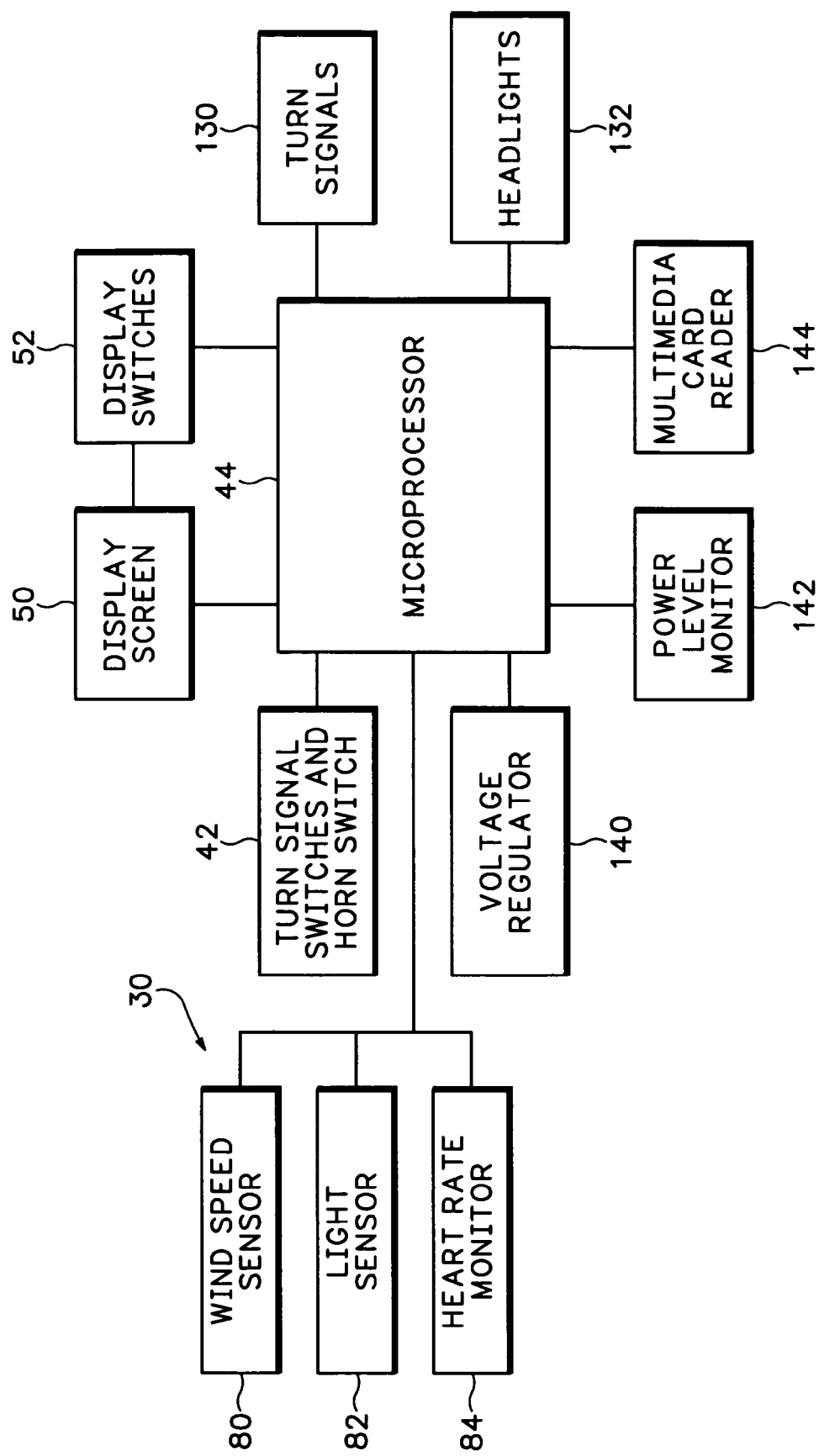
FIG. 4 is a block diagram of components of a second part of the electrical system of FIG. 2.

Although particular sensors, controls, inputs, and outputs are shown as coupled to particular components in FIGS. 2-4, it should be assumed that any components of the electrical system 10 can receive appropriate signals from or generate signals for any other component in the system 10. Additionally, only a single power/data cable 32 is shown connecting the fender module 20 to the console 40, but any communication method is an acceptable alternative, such as using multiple individual cables, or even a wireless communication system, as is known in the art. Advantageously, any communication cables may be routed through hollow components and within frame members of the bicycle 8 to protect the cables and improve the aesthetics of the bicycle.

FIG. 3 is a functional block diagram of portions of the electrical system 10. For convenience, many of the sensors 30 and other functional blocks are illustrated as being connected to the microprocessor 24, but many or all of them could be connected to the microprocessor 44 of FIG. 4. Additionally, embodiments of the electrical system 10 could operate with only a single microprocessor.

Illustrated in FIG. 3 is the microprocessor 24 coupled to a variety of sensors 30. Such sensors may include, for example, an air pressure sensor 60, a temperature sensor 62, a humidity sensor 64, a mechanical motion sensor 66, a pedal motion sensor 68, a wheel motion sensor 70, an accelerometer 72, and a compass 74. Although functionally these sensors 30 are illustrated as being coupled to one another, with only a single connection to the microprocessor 24, typically each of the sensors would be directly connected to the microprocessor 24, through a serial data, parallel data, or analog signal port, as is known in the art.

Other functional blocks representing inputs or outputs are also illustrated in FIG. 3 as being connected to the microprocessor 24. These inputs or outputs include an external clock 112, a power/interrupt controller 114, a CPU supervisor 116, a fender port 118, rear turn signals 120, tail lights and deceleration lights 122, a security alarm 124, and a security key input 126. These inputs and outputs are explained in detail below.

Similarly, as illustrated in FIG. 4, additional sensors 30 and other inputs/outputs are illustrated as being connected to the microprocessor 44. Illustrated in that figure are a wind speed sensor 80, a light sensor 82, and a heart rate monitor 84. Further inputs/outputs include left and right turn signal and horn switches 42, the display screen 50 and control switches 52, front turn signals 130, headlights 132, a voltage regulator 140, a power level monitor 142, and a multimedia memory card reader 144.

In some embodiments, the microprocessors 24 and 44 can each be Hitachi H8S2238 microprocessors, each of which contain a CPU, RAM, FLASH memory, A/D (Analog to Digital) and D/A (Digital to Analog) converters, various counters and a number of I/O ports. Skilled electronic designers will recognize that other microprocessors could be functionally substituted with greater or lesser integration of on-board peripherals and corresponding external circuitry.

A number of peripherals have been functionally described above and are further described herein. While an electronic circuit is designed to use specific components, it is readily possible for one skilled in electronic design to substitute other components for cost, packaging or performance reasons. The concepts described herein are independent on the specific components used for implementation.

Software to drive the microprocessors 24, 44 is not specifically illustrated, although a description of the processes and calculations performed by the processors is described. The specific codes used to drive the microprocessors are implementation specific. Generally, the program instruction codes are stored within the memory of each microprocessor 24, 44, as described below with reference to FIG. 8. Although the H8S2238 uses FLASH memory, instructions could also be stored in RAM, EPROM, ROM, disk, or other mediums as is well known to those skilled in the art.

Microprocessors 24 and 44 may work in tandem to carry out the functions of the inventive system and can communicate to one another as described above. In one embodiment the microprocessors 24 and 44 communicate using a serial data connection. Each microprocessor 24, 44 may include a transmit pin that is coupled to a receive pin and to an interrupt pin of the other microprocessor. Transmit pins send data in an asynchronous serial (for example 8 bit word, no parity, 1 stop bit, 115 k baud) to the other processor's receiver pin. The interrupt pin is connected to the receiver so that each microprocessor 24, 44, is interrupted when it receives a transmitted signal from the other microprocessor. This allows each processor 24, 44, to run in a low power mode with the serial receive port pin turned off. This saves power over always keeping the receive port active. When the interrupt pin receives a signal, the receiving processor awakens and processes the received data. Although two processors, 24, 44, are illustrated as performing the functions of the electrical system 10, it is quite feasible to run all functions from a single processor or amongst several processors if packaging or other concerns dictate. Additionally, although described here as asynchronous communication, embodiments of the invention may use synchronous communication instead of or in conjunction with the asynchronous communication.

Power Supply & Power Conservation

The central power supply 22, such as a battery system, may be used to power the electrical system 10. In an exemplary embodiment, power can be supplied by six AA alkaline batteries that are connected in series, which provides a nominal 9-volt source. The power supply 22 can be conveniently located in the fender module 20.

If batteries are used as the power supply 22, the instant voltage of the power supply 22 will diminish as stored energy in the batteries is consumed and/or the system is operated under heavy loading conditions. Embodiments of the invention are designed to accept voltages ranging from five to eleven volts, thus allowing a range of battery technologies, freshness conditions and cell sizes. For example, six AA alkaline batteries in series will output approximately nine volts when new and gradually diminish to about 4.8 volts at end of life.

Depending on specific design goals, other battery technologies can be substituted. These other battery technologies can include rechargeable or non-rechargeable systems, such as nickel cadmium, lead-acid, nickel metal hydride, lithium ion and others. Other battery sizes can also be used, according to weight and capacity trade-offs. For example, the circuits described would function equally well with six "D" cell alkaline batteries. D cells offer higher stored energy capacity but at a greater weight. If circumstances require a different range of voltage inputs than the five to eleven volts preferred in this implementation, the circuitry is readily modified to accommodate. The power source can be regenerativly recharged by an electrical generator (not shown) mounted somewhere on the bicycle 8 to provide generated power from any combination of the front or rear wheels, pedal crank, or the transmission that transfers power from pedals to the rear wheel. It could also derive power from air motion relative to the bike's movement. The regenerator could be activated only when decelerating, thereby not adding any drag when the bicycle is being powered, but converting unwanted kinetic energy to electrically stored energy when the bicycle is slowing or braking. Another embodiment could use solar cells (not shown) to recharge the power source.

It is desirable to minimize the size of the power supply and efforts required to maintain it. Bicycles are typically idle (not ridden) a great proportion of the time. To minimize power consumption during idle periods, both microprocessors 24, 44 place peripheral components into low power or shut-off mode whenever possible. Both microprocessors 24, 44 place themselves into low power mode during idle times but are programmed to wake up periodically and acquire system readings and to detect if the bicycle has been put into active use. This state of minimized power consumption is termed herein as "shut-down" mode.

In some embodiments, the bicycle 8 determines to go into the shutdown mode by monitoring the input from the accelerometer 72 (FIG. 3). The accelerometer 72 can be, for instance, an accelerometer from Analog Devices, Inc. type ADXL202E. This accelerometer 72 senses motion on two axes and outputs a series of pulses corresponding to the rate of acceleration or deceleration sensed in each axis. Of course other types or models of accelerometers could be used to achieve the same result.

In operation, the microprocessor 24 detects the series of pulses from the accelerometer 72. If no changes in acceleration are detected for a period of time, the bicycle 8 is presumed idle. If the microprocessor determines that the idle state persists for a period of time, the microprocessor 24 enters the shutdown mode. One example time period is a three minute waiting period. If the microprocessor 24 detects no motion of the bicycle (by monitoring the accelerometer 72 input) for approximately three minutes, the microprocessor 24 enters the shutdown mode, and instructs the microprocessor 44 to also enter shutdown mode. Other time periods are possible.

Some embodiments of the invention also include a mechanical motion sensor 66, illustrated in FIG. 3. The microprocessor 24 may monitor the motion sensor 66 instead of or in addition to the accelerometer 72 to determine when to enter the shutdown mode.

The microprocessor 24 also determines expected battery life by monitoring an instant voltage level of the power supply 22, and can output an indication of the expected battery life on the display screen 50 (FIG. 4). As illustrated in FIG. 4, the power level monitor 142 provides a signal input that is read by the microprocessor 44. The power level monitor 142 is coupled to an analog input of the microprocessor 44. The microprocessor 44 reads the instant voltage level from its analog input and calculates a projected remaining battery life. The closer to life's end the batteries come, the lower the instant voltage that will appear at the microprocessor's input. Each battery type—NiCad, alkaline, lithium-ion, etc. follow life-discharge patterns that make it possible to give reasonable estimations of remaining battery life. Battery life information can be displayed on the display screen 50 to the user each time the bicycle 8 enters an active state (non-shutdown state) and/or whenever the user requests battery life information by pressing appropriate control buttons 52, described below.

Many of the electronic components illustrated in FIGS. 1-4 receive tightly controlled voltages, which allows them to operate efficiently. Embodiments of the invention may incorporate one or more switching voltage regulators 140 (one illustrated, FIG. 4) to regulate the voltage from the power supply 22.

In some other embodiments of the invention, the power supply 22 may include a number of different, separate power supplies. For instance, the display screen 50 or other components of the electrical system 10 may be powered separately through a first power supply, while the remainder of components are powered by a second power supply. Of course, any number of separate power supplies could be used without deviating from the spirit of the invention.

Display Screen and Control Buttons

As illustrated in FIGS. 2 and 4, the bicycle 8 includes a display screen 50 to communicate information back to the rider. In some embodiments, the display screen 50 is a Liquid Crystal Display (LCD) screen. In one particular example, the display is an AZ Displays, Inc model AGM1264E, containing a matrix of 128×64 pixels.

The display screen 50 may be backlit for low-light or night viewing, and can be illuminated by lighting a Light Emitting Diode (LED) mounted in the console 40 behind the display screen 50. Backlight brightness may be static, or may be adjustable by user action, such as by the user controlling the control switches 52. The microprocessor 44 may control the brightness of the LED by pulse width modulation, for instance.

FIGS. 5A and 5B illustrate front and back views of an example console 40 used in embodiments of the invention. FIG. 5A illustrates the front view, or as viewed from the front of the bicycle 8. Illustrated in this view are turn signals 152, 154, and a headlight 160. Advantageously, the headlight 160 is made of Light Emitting Diodes (LEDs) that can be controlled individually or in groups. FIG. 5B illustrates the back view of the console 40, which shows the display screen 50 and the control buttons 52. By pressing appropriate control buttons, the user can control the electrical system 10, and cause the display screen to output particular data.

Figure 6:
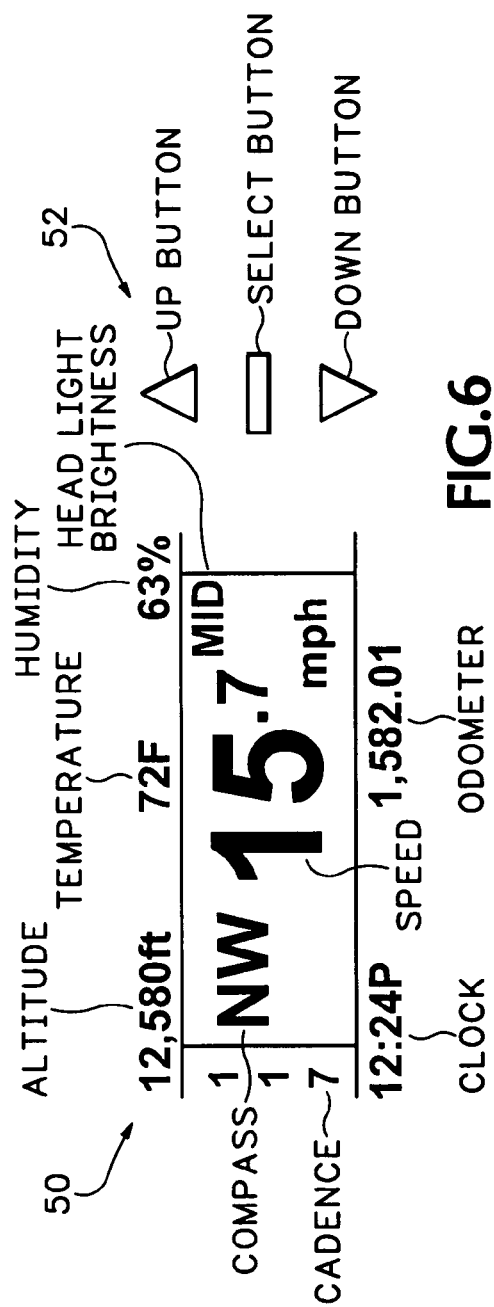
FIGS. 6 and 7 are example views that can be shown on a display screen portion of the electrical system of FIG. 2.
Figure 7:
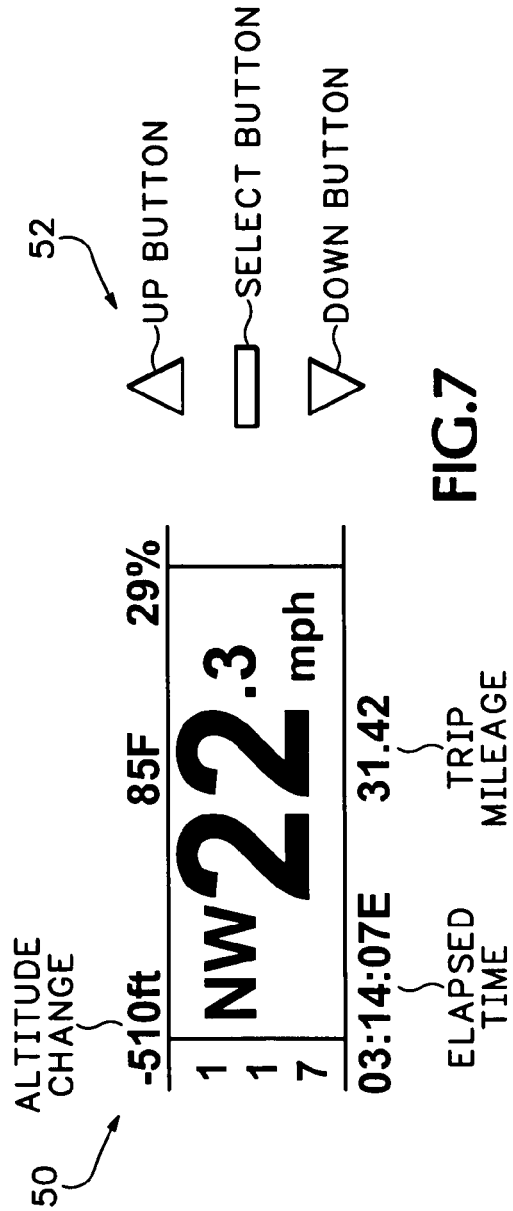

FIGS. 6 and 7 illustrate two example views of information displayed on the display screen 50. With reference to FIG. 6, an "odometer" view is illustrated on the display screen 50. In this view, information such as humidity, outdoor temperature, time and date, altitude, head wind speed, bicycle speed, cadence (rate of pedaling), heart rate and heading can be shown. With reference to FIG. 7, a "trip" view can include information such as altitude change, elapsed time, trip mileage, bicycle speed, heading, temperature and humidity. Some information, such as heading and bicycle speed is shown in both screens. Of course, other screen views are possible and designing such screens is within the experience of one skilled in the art.

Readings from the sensors 30, such as those illustrated in FIGS. 3 and 4 can be combined and manipulated by the microprocessors 24, 44 to determine rate of climb (road grade percentage), pedaling difficulty and environmental difficulty indices, for example. Once derived, these indices can be shown on the display screen 50. Changing screen views, such as changing from the view on the display 50 illustrated in FIG. 6 to the view illustrated in FIG. 7 can be controlled by the user selecting appropriate of the buttons 52.

Headwind, Speed, Distance Sensing and Cadence

Air resistance is a major cost of propulsion energy and increases as a cubed function ($3^{rd}$ power) of speed of bike motion to the surrounding air. This relative resistance of the wind is caused both by the bicycle's motion and the speed of the air (wind speed). A bicyclist pedaling to maintain a speed of 10 mph into a headwind of 10 mph expends eight times the energy of a cyclist pedaling to maintain a speed of 10 mph into a zero speed headwind.

Wind speed is sampled by the bicycle 8 by the pressure (wind speed) sensor 80, which is illustrated in FIG. 4 as coupled to the microprocessor 44. The wind speed sensor 80 may be, for instance, a Motorola MPXV5004G silicon pressure sensor that emits an analog voltage that varies in proportion to the pressure exerted upon it. An amplifier (not illustrated) may be mounted between the wind speed sensor 80 and the microprocessor 44 for scaling the voltage output of the sensor 80 to a level able to be read by the microprocessor 44.

The wind speed sensor 44 is mounted on the front of the bicycle 8, for instance within the console 40 that is attached to the handlebars and houses the display screen 50. A small plastic tube transfers air pressure sensed at a hole 164 in the console 40 (FIG. 5A) to the wind speed sensor 80. The plastic tube is oriented so as to sense air pressed into the front of the bicycle 8. If the bicycle 8 is at rest, air pressure is caused by wind blowing air into the front of the bicycle 8 (headwind). If the bicycle 8 is moving, the air pressure is caused by the forward motion of the bicycle 8 combined with pressure from any headwind.

To sense motion and/or speed of the bicycle, the wheel motion sensor 70 is coupled to the microprocessor 24. One example of the wheel speed sensor is an Allegro A3240ELH Hall effect sensor. Hall Effect sensors detect magnetic fields. Typically, the Hall Effect sensor is mounted to the frame of the bicycle 8, as illustrated in FIG. 1, and one or more magnets are mounted on one of the wheels. For instance, three magnets may be mounted at 120-degree intervals around the rear wheel. As each magnet passes in close proximity to the Hall Effect sensor, the sensor generates an electronic pulse. If three magnets are mounted to the wheels, three such pulses occur for every rotation of the rear wheel.

Hall Effect sensors are preferable to magnetic reed switches traditionally used in some bicycle speed measurements because there is no contact movement within the sensor, and therefore the sensor cannot have an internal mechanical breakdown, as the reed switches can. The life expectancy of a reed switch that senses three pulses per wheel revolution is only about one or two thousand riding miles. A Hall Effect sensor will typically last many times longer. The Hall Effect sensor is also considerably smaller than a reed switch.

Because the rear wheel of the bicycle 8 has a fixed size, each pulse count can be accurately translated into a distance traveled. For example, a 26-inch wheel diameter translates into a circumference of π×diameter, which approximates 26×3.14159, or 81.68 inches. Each pulse represents ⅓ of this total distance or 22.227 inches.

By counting the number of pulses that occur within a time interval, the microprocessor 24 can determine the distance traveled by the bicycle 8. By incorporating a time measurement, the microprocessor 24 can also determine the speed of the bicycle 8 (distance divided by time).

Once the microprocessor 24 determines the speed, time and distance, the information is transmitted to the microprocessor 44, which can present them on the display screen 50. FIG. 6 illustrates the display screen 50 including the speed, 15.7 Mph, and the odometer, 1582.01 miles. FIG. 7 illustrates the display screen 50 including the trip mileage, 31.42, and the elapsed time, 3:14:07.

Each microprocessor 24, 44 may include an internal clock that accurately measures time intervals. Additionally, the external clock 112 (FIG. 3) may be coupled to either or both of the microprocessors 24, 44. One example external clock is A Maxim MAX1375 clock/calendar circuit that includes a separate DS32KHZ temperature compensated oscillator to maintain accuracy over long time periods and in a variety of operating environments.

To determine headwind, the microprocessor 24 subtracts the forward speed of the bicycle 8, as determined by the microprocessor 24, from the headwind speed calculated from the voltage output of the wind speed sensor 80. In effect, this calculation "removes" the air pressure caused by the bicycle's forward motion and leaves only the air pressure directly caused by headwind. The net headwind value thus calculated may then be shown to the rider on the display screen 50. The headwind value is preferably shown in conjunction with other motion indicators, such as bicycle speed and distance traveled, to help the rider to better understand the conditions in which he or she is riding.

The pedal motion sensor 68 (FIG. 3) can also be mounted on the frame of the bicycle 8 to measure the motion of the pedals or crank, as illustrated in FIG. 1. Such a sensor 68 can measure crank rotation. If a second Hall Effect sensor is used as the pedal motion sensor 68, the sensor senses the rotating crank when it passes in proximity to the sensor and generates one pulse for each revolution of the pedals. Oftentimes this measurement is called cadence. The microprocessor 24 senses the signal from the pedal motion sensor 68 and determines cadence by monitoring the time between each pedal rotation. The microprocessor 24 then sends the cadence information to the microprocessor 44, where it can be further forwarded to the display screen 50 for display. FIGS. 6 and 7 illustrate the cadence as a vertical number along the left side of the display screen 50. The rider can specify a desired cadence range he wishes to maintain. Cadence reports can also be provided to the rider by using an audio signal, such as through the speaker 56. In some embodiments, the microprocessor 44 will cause the speaker 56 to "beep" at a measured or desired cadence. In other embodiments, the microprocessor 44 causes a visual or audio signal when the cadence falls outside a pre-established minimum and maximum range.

Altitude Sensing and Grade Measurement

The air pressure sensor 60 of FIG. 3 may be, for example, an Intersema, Inc. MS5534AM pressure sensor that is configured to sense surrounding air pressure (barometric pressure) and communicate the reading to the microprocessor 24. In some embodiments, the air pressure sensor sends the data to the microprocessor 24 using a serial interface. Barometric pressure diminishes with altitude at a very predictable rate, therefore, with a moving bicycle 8, barometric pressure is used to determine a relatively close approximation of instant altitude. The microprocessor 24 receives the pressure reading from the pressure sensor 60, derives an altitude from that reading, and sends the data to the microprocessor 44 to be displayed on the display screen 50. An example altitude reading is illustrated in FIG. 6, where the altitude reading is shown as 12,580 feet.

Increases in altitude occur as a result of riding the bicycle 8 on upwardly inclined surfaces. The rider works against gravity to lift the bicycle 8 and his or her body upward on that incline. If the incline is relatively steep, considerable effort may be required. Road and slope inclines are most commonly measured as a grade percentage, which is the distance moved upward divided by the distance moved horizontally, or rise over run. A grade of 100% indicates that a ten-foot movement forward also results in a ten-foot increase in Altitude—the same as a 45 degree angle. A grade of 5% indicates that for every hundred feet traveled forward there is a five feet increase in altitude. Practically speaking, most roads are limited to grades of 20% or less, with even a 5% grade considered relatively steep.

Bicycle riders benefit by understanding the grade over which they are traveling and can slow their rate of travel on steep grades to pace their effort and avoid premature fatigue. Embodiments of the invention calculate a road percentage by combining distance traveled, measured through the wheel motion sensor 70 as described above, with altitude.

Distance traveled includes both a horizontal and vertical distance, and is effectively the hypotenuse of a right triangle in which the opposite side represents altitude increase and the adjacent side of the triangle represents horizontal distance. Using the Pythagorean Theorem, the microprocessor 24 converts altitude gain and the measured travel distance into a horizontal distance traveled. From the altitude increase (calculated by the microprocessor 24 based on data from the air pressure sensor 60) and the horizontal distance calculated as above, the microprocessor 24 determines the grade of the traversed slope.

The grade can be determined over any number of distances. Few roads have perfectly constant grades. Mountains and hills sometimes have areas of steep inclines followed by more shallow gains. Embodiments of the invention are structured to calculate grade over several intervals and display them simultaneously on the display screen 50, or allow the user to select which grade interval to display, by manipulating the appropriate control buttons 52. For example, a grade percentage can be calculated for every 0.01, 0.05, 0.1 and 0.25 miles traveled or at custom intervals chosen by the rider. The calculation can be weighted over the chosen distance. Additionally, grade percentage calculations can be performed at periodic altitude gains instead of distance traveled and weighted according to application. Both methods are supported by the electrical system 10 and may be used separately or in tandem.

Barometric pressure changes with both altitude and weather, and a change in one can cause an error in the other. In other words, a single variable, air pressure, can indicate changes in barometric pressure, changes in altitude, or both. Embodiments of the invention introduce methods and steps to minimize falsely attributing changes in one for the other.

To minimize such errors, the microprocessor 24 uses activity detected by the accelerometer 72 and wheel motion sensor 70 to deduce the cause of a change in pressure detected by the air pressure sensor 60. If bicycle 8 speed is zero and no changes in acceleration are sensed, the bicycle 8 is presumed to be stationary, and any change in air pressure is presumed to be caused by a change in weather.

Accelerometer readings may be included in altitude calculations described above to further reduce false readings. A bicycle 8 that is being transported by another vehicle—a car or truck for example—would show a zero forward speed but could still be moving to higher altitudes because of the travel of the vehicle carrying it. The accelerometer 72 detects all motion experienced by the bicycle 8, whether caused by pedaling or transportation. If there is forward motion or significant change in acceleration, changes in air pressure are attributed to altitude gain, since the bicycle 8 is known to be in motion. If no motion is detected by any of the various ways the microprocessor 24 can detect motion, changes in barometric pressure are considered to occur at a constant altitude if the are within a range that can reasonably be attributed to weather. The multitude of inputs available to the microprocessor 24 allows many different ways to determine altitude and barometric pressure changes based on the input from the air pressure sensor 60.

It is useful to the rider to understand how the combination of altitude change and headwind affect the amount of effort required to accomplish a ride. The microprocessor 24 may include functions to combine any combination of speed, altitude gain, estimated road grade percentage and/or headwind speed to calculate and display a ride difficulty index, RDI.

The effort required to ride on flat terrain with no headwind is the baseline effort, requiring X amount of energy to cause the bicycle 8 to move a given distance at a given speed. The baseline effort is determined by computing the effort required to move a unit of mass over a distance without altitude gain or loss. While not essential, calculated accuracy is enhanced by including factors of rolling resistance, still air resistance, air density (as derived from altitude (described above), temperature (from the temperature sensor 62 (FIG. 3)) and humidity (from the humidity sensor 64)) and inefficiencies in the bicycle's transmission system. The unit of mass includes bicycle 8 weight, rider weight and payload. The bicycle 8 weight is known at time of manufacture. The combined rider and payload weight can be a presumed value—for example 130 pounds on a small-frame bicycle and 200 pounds on a large frame bicycle—or, more accurately, as an exact value as specified by the rider by entering the value in a setup screen by manipulating the control buttons 52, for example.

A second calculation, the actual effort, is performed by the microprocessor 24 using the same factors used to determine baseline effort, but also including effects of road grade and headwind.

The RDI is determined by dividing actual effort by baseline effort. Thus, a ride over flat terrain would have an RDI of 1. A 10 mph ride over flat terrain into a headwind of 10 mph requires eight times the effort as the baseline effort results in an RDI of 8. Effects of riding on upward inclines similarly increase the RDI. Descending a grade or having a tailwind can produce an RDI of less than 1. In some embodiments, a tailwind sensor could be built into the fender 20 (FIG. 1) and be coupled to the microprocessor 44 similar to how the wind speed sensor 80 is built into the console 40.

If rider and payload weight are known, it is also possible to accurately calculate approximate total energy expended using various factors known or determinable by the microprocessor 24, such as: speed of travel, distance traveled, headwind, and changes in altitude. Energy dissipation can be measured in calories, joules, watts or any of a number of other such scales. By using memory included in the microprocessor 24, or elsewhere, the electrical system 10 can track energy expended (dissipated) by time interval, ride, trip or a group of rides. It can also track several different riders, and track separate statistics for each. Besides energy, other statistics can be similarly kept by any combination of time interval, ride, trip, night, day, rider or accumulated total or subtotal. These can include, but are not limited to, distance, time, total altitude gain, net altitude gain or distance. Wind speed, riding speed and cadence may be recorded as average, maximum and minimum as well.

Deceleration Indicator

Vehicular brake lights have long been important safety indicators. Conventional designs connect a switch the brake control and illuminate a light when that control is activated. In a car for example, the switch is connected to the brake pedal. Whenever the driver presses the brake pedal, the brake light illuminates. Motorcycles and bicycles do much the same but replace the brake pedal with a hand control.

In such cases, a brake light is really an indicator that the brake control is pressed, not that the vehicle is slowing. That can lead to confusion as drivers sometimes touch the brake control without actually braking, falsely signaling that the vehicle is slowing. Also, most braking systems give no indication of how quickly the vehicle is slowing, though in the late 1990's BMW introduced a system, called adaptive braking, that offers a variable brightness brake light that indicates how hard the driver is pressing on the brake pedal.

Embodiments of the invention vary a brake light brightness in relation to the actual reduction in speed of the vehicle rather than the amount of force placed on the brake control. This is accomplished by using an input from the accelerometer 72 (FIG. 3) as a control to drive the tail light/deceleration light 122. As described above, accelerometers are devices that sense change in the rate of travel and emit a corresponding electrical signal. Accelerometers can be created in a number of ways. Early accelerometers were constructed of enclosures partially filled with liquid which would move as the rate of travel changed by either speeding up—accelerating, or slowing down—decelerating.

More recently, micro-machined accelerometers have been developed that are encapsulated within an electronic integrated circuit package. Such devices offer the benefit of low cost, small size, great accuracy and high reliability. One example of the accelerometer 72 is the ADXL202E by Analog devices, which senses acceleration rate on two axes. Once sensed, it emits a Duty Cycle Modulated (DCM) electrical signal that is proportional to the rate of change in acceleration. The microprocessor 24 counts the pulses emitted by the accelerometer 72 and determine by what rate speed is changing. To accurately sense vehicle deceleration with the accelerometer, one of the axes of the accelerometer 72 should be parallel to the plan of vehicle travel.

The microprocessor 24 reads the rate of speed change from the accelerometer 72 and illuminates the deceleration indicator 122 when the deceleration rate meets or exceeds a predetermined value. In an alternative embodiment, the microprocessor 24 varies the brightness of the deceleration indicator 122 in proportion to the rate of deceleration. The brightness may be scaled linearly on acceleration or by a multiplier. Typically one would desire the deceleration indicator 122 to get brighter as the deceleration rate increases, but other responses might be desirable in particular circumstances. Someone following a vehicle equipped with this sort of variable intensity deceleration indicator will not only know that the vehicle is slowing but gain an approximation of the rate of speed reduction. It is possible to use this system as an acceleration indicator as well.

In some embodiments of the invention, the deceleration light 122 is formed of four red LEDs. Intensity of the light emitted from the deceleration light 122 can be modulated by pulse width modulating a control terminal of the LEDs. Other light sources, such as incandescent, fluorescent, or other lighting technologies could also be used.

This deceleration indicator is equally useful on cars, trucks, motorcycles, bicycles and tricycles. Such a technology could also be applied to various forms of aircraft, trains, and other moving vehicles. An added advantage is the indication of speed change even when brakes are not being applied. On a bicycle, for example, if the rider stops pedaling for even a brief time, especially when riding on an incline, speed can rapidly drop. Cyclists or cars following close behind might not immediately detect that a slowdown is occurring. The deceleration light 122 system, as described herein, would operate in this condition, where prior "brake light" systems would not, because the brakes are not applied. This is also useful on cars when the driver ceases to apply acceleration to the gas pedal in heavy traffic. A driver often does this to increase the distance by which he is following a car ahead but a brake light gives no indication of the resulting speed change to the following drivers. Motorcycles and other vehicles benefit from this feature too.

It is also possible to calculate changes of speed, including deceleration, by monitoring input from the wheel motion sensor 70 instead of, or in addition to using the accelerometer 72. In such a system, the microprocessor 24 determines how long it takes for a wheel to rotate over a given distance, as described above. If the time period for the wheel to rotate the same number of turns increases compared to the previous period, the bicycle is slowing.

Although described as being mounted to the rear of the fender 20, the deceleration light 122 may be mounted anywhere on the bicycle 8. Additionally, the deceleration light need not be mounted to the bicycle itself, but may be provided on or within another vehicle or base station. Such a system can be implemented by connecting the microprocessor 24 to a wireless transmitter, optical or radio frequency. A compatible receiver in the other vehicle or base station would receive the signal and pass it on to another microprocessor for display. Further, the deceleration light 122 need not be a "light" at all, but rather another indicator, such as a sound generator. When the vehicle is decelerating, a varying sound signal could be generated, such as increasing in loudness or by changing pitch.

It can also be useful to indicate these changes in acceleration and deceleration to a display system within the vehicle whose acceleration and deceleration is being monitored. For example, indications of the rate of acceleration or deceleration could be sent to the microprocessor 44 and shown on the display screen 50.

Direction, Temperature, Humidity, Heart Rate and Difficulty Index

The compass 74 of FIG. 3 may be embodied by a Honeywell HMC 1052 2-axis magnetic sensor, which determines the direction in which the bicycle 8 is facing by sensing the earth's magnetic field. Of course, other magnetic sensors could be used. Directional information is communicated to the microprocessor 44 to be shown on the display screen 50. The display may be in compass point information (N, NE, E, SE, S, SW, W, NW) or as a degree reading (0-359 degrees), for instance. FIGS. 6 and 7 illustrate the bicycle 8 having a "NW" (northwest) heading. Compass information may also be logged in memory coupled to either of the microprocessors 24, 44 for later reconstruction of the route traveled.

Temperature and humidity sensors 62, 64 sense temperature and relative humidity, respectively, from their surrounding environment and communicate the sensed information to the microprocessor 24. This information can be communicated to the microprocessor 44 and to be shown on the display screen 50, as illustrated in FIG. 6 and 7.

The heart rate monitor 84 senses a signal from a chest strap (not shown) worn by the rider. The chest strap transmits a pulse each time the rider's heart beats. The heart rate monitor outputs a voltage pulse to the microprocessor 44 each time it receives a heartbeat signal. The pulse may be amplified between the heart rate monitor 84 and the microprocessor 44 to properly align to the input range of the microprocessor 44. The microprocessor 44 measures time between pulses, averages them, and outputs a heart rate value to the display 50. Heart rates can also be recorded and later presented as peak and overall average rates. Further, historical data may be collected and stored that indicates an amount of time during which heart rate was above a target value. Such indicators are useful in fitness regimens.

Temperature and Humidity can dramatically affect the human body's performance and are important conditions to monitor, especially during times of significant physical exertion. "Heat Index" is a well-known calculation that represents the effects of the combination of humidity and temperature on the human body. The Heat Index is but one example of a variety of "difficulty indices" that can summarize how difficult current riding conditions are for the human body in general or the rider's body state in particular.

Warnings can be presented to the rider when the monitored heart rate rises above a predetermined value that varies with any difficulty index. The electrical system 10 also allows the rider to specify his or her age, and factor this age in determining when to issue the heart rate warnings. Warning may be presented visually through the display 50, or audibly through the horn 48 or other speaker, a combination of both methods, or by any other acceptable method.

Security

Bicycle theft is a major concern. Conventional bicycle locks are useful theft deterrents but there are many methods of overcoming them. Embodiments of the invention include a motion detection system that triggers an alarm whenever the bike is moved without authorization.

The accelerometer 72 can monitor any change in acceleration (movement) along two separate axes and issues pulses that correspond to the forcefulness of that movement to the microprocessor 24. The microprocessor 24 monitors such motion signals and determines when an unauthorized motion occurs, such as by comparing the amount of acceleration to a threshold amount. Once the present amount of motion exceeds the pre-established threshold, the microprocessor 24 causes an alarm, such as by sounding the security alarm 124 (FIG. 3), flashing lights, or by other methods.

The security key reader 126 can be used in conjunction with a unique key held by the rider. One such key is a Dallas Semiconductor DS-1990A iButton (not shown). The DS-1990A contains a unique 64 bit electronic identifier enclosed in a rugged metal cylinder, and can be used to arm and disarm the security system.

When the iButton device touches the security key reader 126, the microprocessor 24 immediately reads the identifier and compares it against a list of authorized users held within memory of the microprocessor. If the ID matches one of the pre-stored IDs, the electrical system 10 enters an armed mode. After a brief time period, for example 60 seconds, any motion that exceeds a predetermined acceleration threshold causes an audible alarm to sound through the security alarm 124. The acceleration threshold is set to avoid alarm activation caused by wind or accidental contact from other people or objects. Also, when the threshold is first exceeded, in some embodiments of the invention, the alarm 124 emits brief audible pulses to warn of its activation. If motion continues, the alarm increases in volume and sounds continuously. The security alarm can be embodied by piezo audio transducers, which can emit sound at levels in excess of 100 db.

The alarm is disarmed by again touching an authorized key to the security key reader 126. Each time an authorized key touch occurs against J6, the microprocessor 24 issues an audible confirmation pulse through the alarm 124. When the electrical system 10 is armed, its status is may also be shown on the display screen 50.

In more sophisticated embodiments, the microprocessor 44 can communicate an active motion alarm to a remote indicator. Transmission may be through RF, infrared or other wireless method, and serves to inform the rider of a security violation, even if he or she is not within hearing distance of the audio transducers built into the bicycle 8.

Audible Alarms and Alerts

The primary means of communicating with the rider by the electrical system 8 is visually through the display screen 50 in the console 40. Alarms and alerts about any conditions, including, but not limited to, turn signal activity, heart rate, humidity, time, temperature, distance, speed, altitude and cadence can also be presented through the audio speaker 56, which may be used in addition to, or in place of, visual indications. For example, an active turn signal can appear as a flashing arrow on the display 50, and can also (or instead of) be represented as an audio signal through the speaker 56. Of course the speaker 56 may not be a "speaker" in a conventional sense, and may instead be any device capable of generating an audio signal.

Rider Controls & Packaging

Riders can easily access turn signals, horns, and select information for viewing on the display screen 50, even while riding. In embodiments of the invention, the display control switches 52 are conveniently mounted in the console 40, near to the display screen 50 itself. Additionally, the buttons 42 for the left turn signal, right turn signal, and horn are conveniently mounted to the handlebars. This allows the rider to make selections and activations without having to remove a hand from the bicycle steering mechanism.

Embodiments of the invention integrate the display screen 50, control switches 52, turn signals 130 and headlights 132 into a single console 40, which is centrally mounted between the handlebars. Other embodiments combine only the headlights 132 and the display screen 50 in the console 40. The display console 40 can be tilted to adjust the area on which the headlight focuses the majority of its energy.

Lights & Turn Signals

The headlights 132 and a tail light 122 can be activated by the user pressing one of the switches 42, 52, or the electrical system 10 may automatically turn them on. The light sensor 82 (FIG. 4) is coupled to the microprocessor 44. The light sensor 82 may be a photoresistor, for example, or other type of photo detector. The microprocessor 44 monitors the output from the light sensor 82. When the sensor reading exceeds a threshold, the microprocessor 44 applies or removes power from the bicycle's various lighting systems 122, 132. The readings from the light sensor 82 may be averaged by a process running on the microprocessor 42 so as not to activate lights due to a temporary event that blocks light from reaching the light sensor 82. Otherwise, waving a hand over the light sensor 82 may falsely trigger the lights 122, 132 to turn on. Additionally, the lights 122, 132 will also turn off when the light sensor 82 shows that ambient light has increased above a predefined level. The predefined levels are stored in memory in the microprocessor 44, and may be adjusted by the user entering a desired selection using the control switches 52.

As described above, the headlights 132 may be formed of multiple LEDs 160 (FIG. 5A). FIG. 5A illustrates ten LEDs 160, but any appropriate number can be used, of course. Additionally, embodiments of the invention divided the LEDs into three separate groups, each of which being separately controllable. In one such embodiment, a group of four LEDs is used as the primary headlights, a first group of three supplements the primary headlights, and a second group of three provides even more illumination.

Illuminating four LEDs is typically adequate for night riding in urban areas with street lights. In darker conditions, the first set of three supplemental LEDs can be turned on, bringing the total to seven illuminated LEDs. The supplemental LEDs may have a slightly different positioning angle in the console 40 than the primary four LEDs, which causes a larger area to be illuminated than the primary four LEDs alone. Additionally, the second set of supplemental LEDs can also be illuminated, bringing the total of illuminated LEDs to ten. Because the second set of supplemental LEDs can also have a slightly different illumination angle than either of the other groups, driving all ten LEDs provides the brightest and broadest illumination area possible by the headlights 132. Of course, any number of LEDs and any number of groupings are possible. For instance all LEDs in the headlights 132 may be controlled simultaneously. Or, each LED in the headlights 132 may be controlled individually. Further, the illumination need not be provided by LEDs at all, and the headlight 132 may be formed of another type of light generating device.

Control of the individual LEDs or groups of LEDs may be automatic or manual. If manual control is used, the rider presses one or more of the control switches 52 to control the brightness level of the headlights 132. If, instead, the electrical system 10 is set to control the headlights 132 automatically, a process running on the microprocessor 44 can monitor the output of the light sensor 82. When the microprocessor 44 detects a lower ambient light signal from the light sensor 82, more LEDs are lit in the headlights 132. This can be thought of as the equivalent of automobile high-beams or "brights." If instead the ambient light is relatively brighter, the microprocessor 44 lights fewer LEDs in the headlights 132.

Control of the backlight of the display screen 50, described above, may also be automatically or manually controlled, along with or separately from the control of the headlights 132.

Rear tail lights 122 may be implemented by red LEDs, and may be set to turn on whenever the headlight is active. The rear tail lights 122 may be the same lights used for the deceleration light, described above. In one embodiment, the rear tail lights are illuminated at a nominal level when the headlights 132 are active, and illuminate brighter when the electrical system 8 detects deceleration, as described above.

Front left turn signals 152 and right turn signals 154 (FIG. 5A) may be implemented by amber LEDs. The LEDs may be placed behind a frosted or diffusing lens, as illustrated in FIG. 5A, which disperses the light generated by the LEDs. Additionally, rear turn signals 120 (FIG. 3) may also be implemented with amber or red LEDs. In operation, when the user presses the appropriate switch 42 to control the turn signals 120, 130, the microprocessor 44 accepts the input and activates the appropriate signals. In some embodiments, the turn signals 120, 130 flash on and off when active. The microprocessor 44 may turn off the turn signals 120, 130 when: the same signal switch 40 is pressed again, when the opposite signal switch is pressed, after a time period of X seconds (such as 120 seconds) has passed, or when the accelerometer 72 senses a turn in the direction of the active signal followed by a removal of that turning force. Such an application of force followed by a removal of force indicates the turn is completed.

Electronic Instruction Manual

Embodiments of the invention store an instruction manual in memory such that the microprocessor 44 can retrieve the manual and display it on the display screen 50. Storing an instruction manual in electronic form can eliminate the need for a paper instruction manual. Additionally, because the manual is attached to the vehicle itself, the manual is always available, wherever the vehicle is located. For example, if a rider has a flat tire 25 miles from home, he or she can review the repair procedure directly on the display console 50. Brake adjustments and shifting instructions are two more examples of what can be stored in the on-line instruction manual.

The manual may be stored in graphic form, text form, or a combination of graphics and text. It may be stored in flash memory, so it can be retained even if power is lost. By manipulating appropriate buttons 52, the user can cause a page of instructions to be displayed. Pressing other buttons allows the user to navigate to other pages. An index page may allow random access of particular pages.

Weather Prediction

Since most riding is done out of doors, weather is important. Readings of barometric pressure, temperature, humidity, altitude and wind speed from their appropriate sensors 30 are logged in memory by the microprocessor 44 at periodic intervals. The microprocessor 44 can run applications to analyze the stored readings and make weather predictions. Once the predictions are made, the predictions can be displayed on the display console 50. In cases of sever weather, audible weather alarms can also be issued through the speaker 56.

Additionally, or instead of the microprocessor 44 analyzing the stored readings, some embodiments of the invention include a weather alert receiver 58. Data received by the weather receiver 58 can also be shown on the display 50. When severe alerts are received by the weather receiver 58, an alarm through the speaker 56 or even the security alarm 124 can alert the rider to the dangerous conditions.

Magnetic Brakes

By mounting magnets of alternating poles onto one or both of the rotating wheels, an alternating magnetic field is generated as the wheels spin on the bicycle 8. By mounting one or more inductive coils 90 (FIG. 1) in such a position on the wheel mounts as to pass through these alternating magnetic fields, an electrical current is generated within the coils. This electrical current can be used during normal riding to recharge system batteries in the power supply 22, and/or directly provide power for the operation of the electrical system 10.

Creation of this electrical current is not free, of course. A portion of the energy used to propel the bicycle 8 is drained away from the bicycle's motion. The amount of energy drained away is directly determined by the amount of electrical energy generated, which, in turn, is a direct function of the electrical load placed upon the output of the inductive coils through which the magnetic fields pass.

This phenomenon can be used to advantage. By properly sizing the coils and magnets, enough electrical energy can be drained away to cause the bicycle 8 to come to a complete stop. By connecting brake controls to a variable impedance load placed across the coils 90, the actions of mechanical brakes can be mimicked. The load units would dissipate excess electrical energy as heat. There would be no brake pads to wear down and the coils 90 used for brakes could simultaneously serve as a power generator. The braking using the inductive coils could be used instead of or in addition to standard mechanical braking.

Further, the inductive braking configuration helps prevent bicycle theft. By placing the load(s) into a low impedance state when the bicycle 8 is parked, it is as if the brakes are locked on full time. Considerably greater energy is then required to pedal the bike away and theft therefore becomes more difficult.

Rear View Camera

Bicycle safety is greatly enhanced when the rider has a good view of traffic behind the cyclist. Rear view mirrors are not as efficient on bicycle because they are generally mounted on the handlebars, which must rotate to one side or another during a turn. Such rotation changes the area viewed by the mirror and makes traffic behind the cyclist "invisible."

Embodiments of the invention include one or more video cameras 34 (FIG. 2) mounted to the fender 20, or elsewhere, on the rear of the bicycle 8, and are connected to the microprocessor 44. The image sensed by the cameras 34 can be caused to displayed on the display screen 50 for the rider can see. The display screen 50 can be dedicated to the rearward view or be shared with the above-described information concerning speed, distance, altitude, and other such parameters. On shared displays, information about speed, distance, etc. can be super-imposed over the rear view video, much as television stations present their station logos over the video content. Further embodiments digitally remove all distracting information during times when the rider must concentrate on the traffic behind the bicycle 8. In one such embodiment, this is accomplished by the user pressing appropriate display switches 52.

Still other embodiments "automatically" remove the overlay data whenever one of the turn signals 120, 130 are activated—a time when the actions of rearward traffic is most important.

In alternative embodiments, the electrical system 8 makes the rear view invisible except when the rider requests it by pressing a control button 52 or activating a turn signal 120, 130. In such times, the rear video view can replace whatever information was previously presented on the display screen 50. Alternately, the previous information could still be displayed in overlay mode.

Some video cameras 34 have limited field of view. To increase coverage, multiple cameras 34 can be installed or a single camera can be mounted on a motorized and rotatable mount. Controls for the rider to select which camera to view or to rotate the single camera towards the direction of interest can be provided, such as through the control buttons 52 or a lever or joystick (not shown). Multiple camera views can also be presented as split or alternating images on the display screen 50.

Another related method is to cause camera 34 views to correspond to turn signal activation. If a left turn signal is chosen, for example, the camera 34 with the best view of the left side can automatically have its video data presented. If the camera is rotatable, it can automatically be pointed to the best position from which to view traffic associated with a left turn. Right turns work similarly.

Rear views can also be presented when bicycle brakes are activated or a slowing of speed is detected, as described above.

Data Transfer, Reprogramming Uploading, Downloading and Configuration

Figure 8:
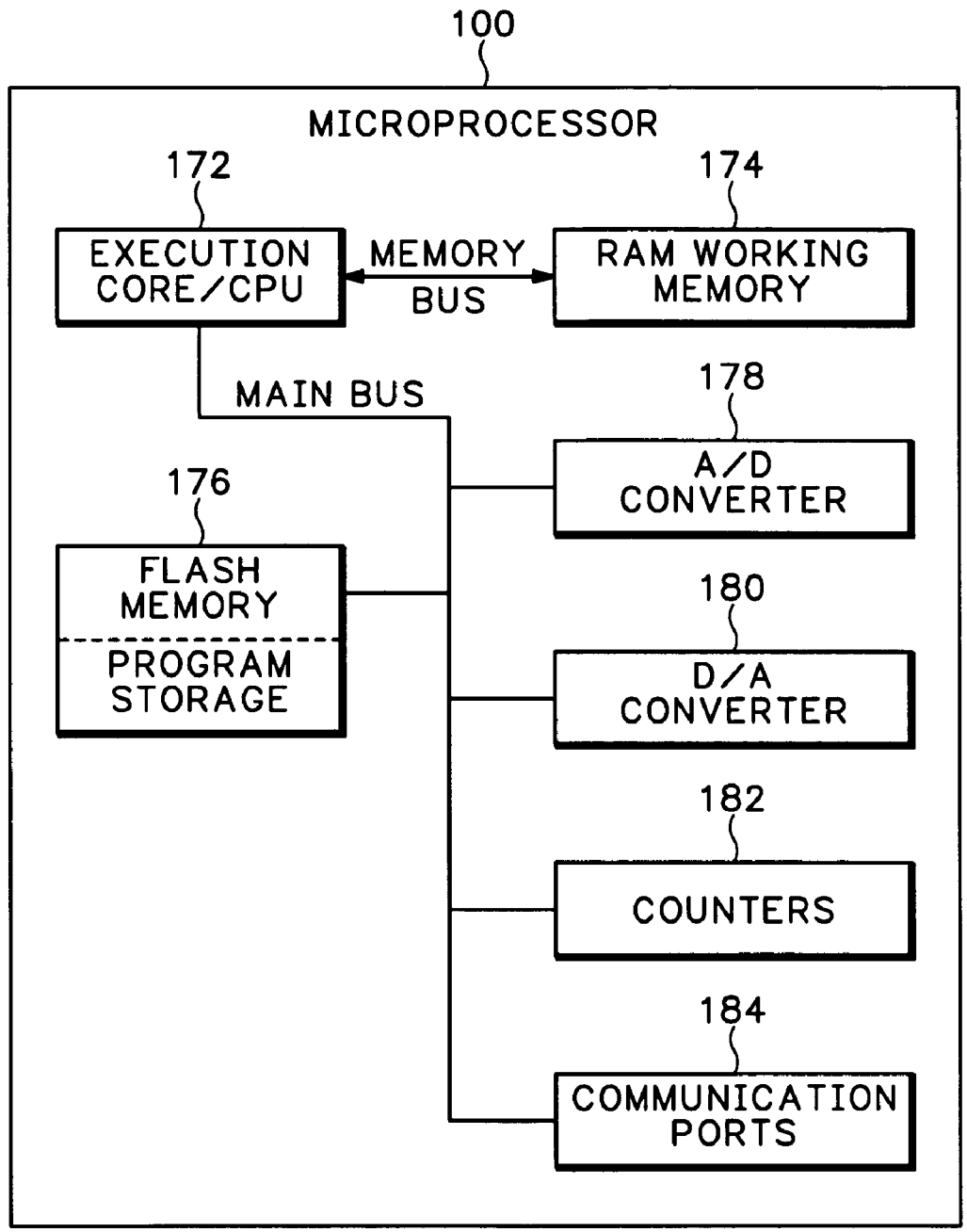
FIG. 8 is a block diagram of sub-components of an example microprocessor that can be used in embodiments of the invention.

FIG. 8 is representative of an example microprocessor including components that can be included in one or both of the microprocessors 24, 44. In FIG. 8, a functional block diagram of a generic microprocessor 100 is shown. The microprocessor 100 includes a execution core or CPU (Central Processing Unit) 172, which is where instructions are performed. The CPU 172 is coupled to Random Access Memory (RAM), or main working memory 174 through a memory bus. The CPU 172 is also coupled to non-volatile or flash memory 176 through a main bus. Other functional components, such as an A/D (Analog to Digital) converter 178 and a D/A Digital to Analog converter 180 are also coupled to the main bus. Further, the microprocessor 100 includes counters 182, and one or more communication ports 184, which allow the microprocessor 100 to communicate with external components. Example communication ports include serial, parallel, and analog voltage inputs and outputs.

Programs for execution by the CPU 172 are stored in the flash memory 176, where they can be retrieved, sent to the CPU over the main bus, and executed by the CPU. Those skilled in the art will understand that all of the operations described above as being performed by one of the processors 24, 44 can be operated in this manner.

The flash memory 176 can be reprogrammed with new software, which is useful in fixing software bugs, improving user interfaces and adding new capabilities. While this electrical system 8, and in particular the microprocessors 24, 44 utilize flash memory 176, other memory technologies can also lend themselves to reprogrammability, including battery backed RAM and EEPROM, among others. Such technologies are well known to those skilled in the art.

Systems built with reprogrammability still require access to the new programming code that it is to be reprogrammed with. That code can be transferred through wired or wireless technologies, including but not limited to wired Ethernet, wireless Ethernet (Wi-Fi or 802.11x) telephone modem, Bluetooth and infra-red.

In some convenient embodiments of the invention, new programming codes can be transferred to the flash memory 176 through the multimedia card reader 144 (FIG. 4). A MultiMedia Card (MMC) (not shown) is a type of non-volatile memory contained in a small, easily portable package. New programming codes can be loaded onto the MMC before the MMC is inserted into the card reader 144. Once the MMC is inserted into the reader, the CPU 172 detects its presence. Once detected, the MMC is read to determine if new codes appear on the MMC. If such new codes are present on the MMC, the CPU 172 reads the contents of the MMC and transfers the new codes into the flash memory 176 for use by the microprocessor 100.

New or updated codes can be loaded into the MMC using a computer or other device that can write the new codes into the MMC for later transfer to the electrical system 10. One method of loading such codes is by inserting the MMC into a card reader/writer coupled to a personal computer (PC) coupled to a network, such as the Internet. The new codes can be downloaded from a website, and stored on the PC. From there, they may be transferred to the MMC through the card writer. Similarly, the codes may be directly downloaded from the Internet to the MMC without being stored on the PC. Of course, other portable non-volatile storage technologies, such as memory sticks, or USB microdrives, and equivalents, are acceptable alternatives.

In addition to the transfer of program code, data transfer is also possible from the electrical system 10 to locations outside of the system. The electrical system 10 can be configured to log the events of one or more rides or ride segments for temporary storage. Each log event can include one or more of the following: rider identifier, time, date, direction, current speed, average speed, maximum speed, distance, temperature, humidity, grade %, altitude, headwind speed, latitude, longitude, current heart rate, maximum heart rate, average heart rate, barometric pressure, etc. The log events can be temporarily stored in the RAM memory 104 or in the flash memory 106, for example.

Log entries are made based whenever one or more specified parameters have changed outside a defined range. For example, a log entry could be made whenever time increases by ten seconds as compared to the last entry, resulting in entries at ten second intervals. Log entries could also be made every time altitude changes by 100 feet or whenever heart rate increases to 150 beats per minute, for example. Any monitored parameter, or combination of parameters, can be used to trigger a log entry.

Although the stored data can take almost any form, one example form of data storage is herein described.

In this example format, three different data records are stored at various times: START, INTERVAL and INCIDENT. The presumed interval time is one minute though longer or shorter interval periods are equally feasible. Interal values may be fixed within software or selectable by the user. Records may be stored in English or Metric units. A preferred embodiment logs all information in metric format and converts that information to English if the rider requests that format.

When the bicycle 8 remains inactive (motionless) for a period of time, it enters a sleep mode during which no event log records are written. The electrical system 10 can determine when the bicycle is motionless by analyzing input from the sensors 30, as described above When the electrical system 10 senses that the bicycle 8 has resumed motion, all systems awaken and a START record is written. The START record logs the time and date at which motion began and also records current software version, odometer settings and other values as shown in the START record outline below.

In this preferred embodiment, all records are written in Motorola format (i.e. big endian) and the two most significant bits of the first byte determine the record type. This yields three record types:

```
0 => RECORD_ID_START
1 => RECORD_ID_INTERVAL
2 => RECORD_ID_INCIDENT
```

Record types 0 (START) and 1 (INTERVAL) are used in conjunction with each other to document a ride. The record type 0 is the starting record, and one of these records is written at the start of each "ride" The starting ride record can then be thought of as a header record for the ride, and it records the following information:

```
id          // =0
minute      // most significant six bits of first byte
hour        // 2nd byte
day         // 3rd byte
month       // 4th byte
year        // 5th byte number of years since 2000
serialnum   // 6-8 byte 24 bit serial number
version     // 9-10 byte version of code
altitude    // 11-12 byte 16 bit starting altitude
odometer    // 13-16 byte 32 bit starting odometer
```

After the starting record is written, an interval record is written at regular periods, one minute in this example. Each interval record indicates the compass direction, altitude, temperature, humidity, and headwind, as measured at the end of the interval period. Also recorded are the total heart beats sensed during the minute, total pedal revolutions (cadence) estimated calories consumed, maximum speed achieved and total change in odometer (distance traveled) during the period. Also recorded are the number of seconds the bike speed was at idle (zero speed) during the period. The idle period allows more precise calculations of average travel speed, important when the rider must occasionally stop for traffic signals, obstacles, etc.

```
id           // = 1
compass_dir  // least significant six bits of first byte
odom_delta   // 2nd byte change in odometer
*altitude    // 3-4 byte absolute altitude
temperature  // 5th byte temperature
humidity     // 6th byte relative humidity
heartbeats   // 7th byte number of heart beats
headwind     // 8th byte headwind (currently always 0)
max_speed    // 9-10 byte maximum speed attained
pedal_revs   // 11th byte cadence
calories     // 12th byte calories consumed
idle         // 13th byte number of seconds idle
extra        // 14-16 bytes unused
```

Incident records track the occasional maintenance or other changes made to the system along with the time and date each occurs. Waypoints are entered by pressing a Waypoint key 52 on the system console 40. A waypoint allows the rider to mark a particular location or begin or end a time or distance measurement from that place.

Other incidents that are recorded include any user or service facility adjustments to time or date, odometer, altimeter recalibration, lights turning on or off, battery replacement (POWER), alarm activation, bicycle configuration is changed (SETTINGS), compass, temperature or humidity recalibration and security key change. Additional incident codes may be added as will be readily understood by one skilled in the art of data logging.

```
id             // = 2
incident_type  // least significant six bits of first byte
second         // 2nd byte
minute         // 3rd byte
hour           // 4th byte
day            // 5th byte
month          // 6th byte
year           // 7th byte
data           // 8-16 byte data as per incident
```

Defined Incident types:

```
0 => RECORD_INCIDENT_WAYPOINT
1 => RECORD_INCIDENT_TIME
2 => RECORD_INCIDENT_ODOMETER
3 => RECORD_INCIDENT_ALTITUDE
4 => RECORD_INCIDENT_LIGHTS
5 => RECORD_INCIDENT_LIGHTS OFF
6 => RECORD_INCIDENT_POWER
7 => RECORD_INCIDENT_ALARM ON
8 => RECORD_INCIDENT_SETTINGS
9 => RECORD_INCIDENT_COMPASS
10 => RECORD_INCIDENT_TEMPERATURE
11 => RECORD_INCIDENT_HUMIDITY
12 => RECORD_INCIDENT_KEYS
```

RECORD_INCIDENT_WAYPOINT has no data, and simply serves as a marker in the ride records.
RECORD_INCIDENT_TIME documents time recalibration.
RECORD_INCIDENT_ODOMETER documents odometer recalibration.
RECORD_INCIDENT_ALTITUDE documents altimeter recalibration.
RECORD_INCIDENT_LIGHTS documents the time on/off of fender LEDs.
RECORD_INCIDENT_POWER documents major changes in power state (sleep, wakeup, reset).
RECORD_INCIDENT_ALARM documents when the alarm goes off as well as whenever it changes state through alarm button(key) use.
RECORD_INCIDENT_SETTINGS documents whenever the fender needs to recover settings from EEPROM in console.
RECORD_INCIDENT_COMPASS documents compass recalibration.
RECORD_INCIDENT_MOTION documents accelerometer recalibration.
RECORD_INCIDENT_TEMPERATURE documents temperature recalibration.

RECORD_INCIDENT_HUMIDITY documents humidity recalibration.

RECORD_INCIDENT_KEYS documents when button (keys) are added/erased.

Each record, regardless of type, is 16 bytes in length. Records types are indicated by the header (first byte) code.

In some embodiments, three 64 k memory blocks are defined and pre-allocated in the flash memory 176 to store the records. When one block becomes filled, information is stored in the next available block. After the second block fills, the third block is used. After the third block is full, the first block is erased to make room for the new data. This is sometimes known as a circular buffer, because there eventually becomes no beginning and no end.

Using the above formats, one 64 k block can hold 4,096 records, which can translate to just over 80 hours of time. With average ride speed of 10 mph, one block is able to store data reflecting about 800 miles of travel.

Embodiments of the invention allow the user to zero out the data records, essentially erasing all prior stored data. A user may wish to do this before starting a long ride and desires that as much data as possible can be stored in the flash memory 176.

A list of log entries "defines" a trip and can be uploaded to an external computer from one of the communication ports 184 for storage or analysis. With reference back to FIG. 4, one of the communication ports 184 may be embodied by the multimedia memory card reader 144. In such an embodiment, the electrical system 10 uploads data from the flash memory 176 into an MMC card that was inserted into the card reader 144. The data can then be easily transported to a PC for long term storage and analysis.

The retrieved log list can be converted to graphical picture of the route by mapping direction changes and distances traveled. The graphical picture can be presented locally on the display screen 50 (FIG. 5B), or on the screen of a personal computer or other similar device, such as a palmtop computer or suitably equipped portable telephone. Software to run such a device can be downloaded from a provider network and/or purchased commercially. Latitude and longitude coordinates allow the trip data to be projected over a geographic map to help a rider document his trip and display to those interested in understanding the ride or to compare against the experiences of other riders. Because speeds, environmental conditions and heart rates are logged, analyses pertaining to the rider's physical condition are possible too.

Just as ride data can be uploaded, maps, directions and geographical data can be downloaded into one of the microprocessors 24, 44 to assist the rider in finding a route or determine the difficulty of upcoming terrain. Such data download could be performed in a similar manner as for upgrading the electrical system 10 software, described above.

Each user has unique requirements. A rider located in Canada might prefer to interpret distance as kilometers while a USA rider might prefer miles. Certain calculations use knowledge of rider age, identity and weight. Different riders may well prefer different formats or combinations of information presentation (skins). User configuration allows the rider to select specifications of, for example, distance displayed in miles or kilometers, temperature displayed in Celsius or Fahrenheit, route directions, goals such as ride time, distance or altitude gain, time and date, user identity (in case more than one rider shares the vehicle) user age (for heart rate and fitness calculations), weight of user and payload, "skin" selection (describes the content and style of information displayed), ID of valid security keys, and other parameters, such as when to restart a maintenance warning.

Certain combinations of the switches 42 and control switches 52 (FIG. 2) may be pressed to cause the electrical system 10 to enter a setup mode. In one embodiment the configuration process begins when the user presses two control switches 52 on the console 40 simultaneously and holds them for at least five seconds. Once within the configuration process, users are guided by information on the display screen 50, and press one or more control switches 52 to make choices and enter values.

For simplicity and convenience, users may specify their preferences and details through a separate configuration computer and then download those preferences to the electrical system 10 through one of the communication ports 114. The configuration computer can be a traditional personal computer or computer workstation, a laptop or palmtop computer or cell phone or personal data assistant. Many other such devices can be used for configuration as well. Besides more versatile inputs, including keyboard, voice or handwriting, such devices generally offer versatile displays, making it easier for the user to see and understand the configuration task.

The program for configuration can be stored within the configuration computer's memory. Alternately, the configuration program can run on a remote computer that is accessed by the configuration computer via the Internet or other methods. One the configuration is completed, the results are transferred to the electrical system 10 using one or more of the means previously described.

Trailer Peripheral

It is sometimes desirable to carry a larger cargo than can be held by the primary vehicle, such as the bicycle 8. In such cases it is useful to attach a trailer to haul the excess cargo. The trailer may be used to carry children, pets or inanimate cargo. It is sometimes desirable to equip the trailer with tail lights, interior lights, stopping indicator (brake light), turn signal, rear view systems and communications. It is often beneficial to control such devices from the primary vehicle, for example, activating turn signals and other lights on the trailer by controls or detection system on the primary vehicle.

The trailer can operate from the power supply 12 of the primary vehicle 8 or its own power source. In some circumstances, it is desirable to have the primary vehicle 8 share the power supply contained within the trailer.

The fender port 118 (FIG. 3) represents a trailer connector to enable such a trailer to be coupled the electrical system 8 through the microprocessor 24. The fender port 118 can include multiple wires, some to carry power and others to carry data. Data may be transmitted in full or half duplex through a serial port, or through a parallel port. This data transfer could be implemented in wired or wireless technologies.

A separate microprocessor in the trailer (not shown) exchanges commands and data with the microprocessor 24 of the electrical system 10. For example, activating the primary vehicle 8 left turn signal causes the microprocessor 24 to send a command to the trailer (through the fender port 118) to activate its left turn signal. The trailer processor accepts that signal and causes the trailer's right turn signal to activate (flash on and off). Verification of the command's receipt and executed process can optionally be sent back to the primary vehicle system.

If the payload of the trailer is a person, a small child, for example, a microphone and speaker can be installed in the passenger compartment with similar equipment installed in the primary vehicle. Voice information is digitized and exchanged between the trailer and vehicle processors through the fender port 118. Such audio equipment can be mounted within the trailer or within helmets word by occupants.

To allow the operator of the primary vehicle to see rearward traffic, the rear-view video camera 34 can be mounted on the trailer instead of, or in addition to, the fender module 20 on the bicycle 8, as described above. Video information can be formatted and, if necessary compressed, then communicated between the trailer and vehicle processors.

To save costs, in some embodiments it can be preferable to run discrete control lines from the primary vehicle 8 to turn signals and other lights, eliminating the need for a separate processor on the trailer.

Trainer Peripheral

Trainers allow a bicycle to be operated indoors. The mechanicals of such trainers are well known. Such systems typically place the rear wheel on rollers or suspended above the surface of the floor so as to turn freely. Generally, a fixed or variable resistance is attached to the wheel though roller or other means to simulate effort required when riding a bicycle over roads. The front wheel of the bicycle is held on a fixed position or placed onto another set of rollers.

Trainers are often implemented with variable resistance to simulate various riding conditions and includes method for selection of that resistance or programs of resistance. The trailer port 118 (FIG. 3) can connect a trainer peripheral to the electrical system 10 to utilize the electronics and display of the bicycle 8 to control the trainer's settings of resistance. The trainer may be equipped with its own processor (not shown) to communicate with the electrical system 10 of the bicycle 8. In other embodiments, discrete control signals allow the electrical system 10 to directly control the resistance and other parameters of the trainer.

A system of elevating the front of the bicycle can be included to simulate riding up and down inclined surfaces. The trainer can be expanded to include temperature, humidity and/or air density controls in order to better simulate riding in specific conditions. Control of the trainer can be made through the control buttons 52, or through other adequate methods.

Entire trips can be simulated through the use of previously-stored trip logs that would cause the trainer to recreate as many of those trip conditions as possible. In other embodiments, a trip can be simulated by gathering altitude information from topographical maps and environmental information from records of the geological are in which the ride is planned. The trainer can include video systems to display scenery correlating to the trip. As with the trailer system, described above, the trainer can draw power from the vehicle 8 or vice versa.

Embodiments of the invention as described herein are only example embodiments, and the invention can be practiced in a number of ways without deviating from the spirit of the invention.

In the above discussion, two separate processors 24 and 44 were described. As is well known in the art, any number of processors, from one to many, could be used in practicing the invention. Discussion of particular processes executing or taking place on particular processors is not determinative of where such processes may actually take place, as any processor in the inventive system could perform the functions. Indeed, the processes need not be performed by a microprocessor at all, but can also be performed by separate standalone circuits, software running on a generic CPU, Application Specific Integrated Circuits (ASICs), programmed Field Programmable Gate Arrays (FPGAs), or equivalent structures.

Different communication methods were described. Any appropriate communication method can be substituted for any of the above-described methods without loss of inventive intent.

The scope of the invention is not determined by the embodiments above described, but rather is determined by the language of the claims itself.

What is claimed is:

1. An alarm system for a bicycle, comprising:
a data storage unit for storing a key value;
a key reading unit for sensing one of a plurality of pre-stored possible authorized key values;
an arming unit for initiating the alarm system when a sensed key value matches any one of the pre-stored authorized key values;
an accelerometer for detecting an amount of vehicle motion; and
an alarm generator coupled to the accelerometer.

2. The alarm generator of claim 1 wherein the alarm generator is structured to generate an alarm when the accelerometer indicates an amount of motion above a threshold amount of motion.

3. The alarm system of claim 1 wherein the alarm generator is an audible alarm generator.

4. The alarm system of claim 1 wherein the alarm generator is a wireless sending unit and wherein said alarm system further comprises a remote indicator for receiving a signal from the wireless sending unit to indicate an alarm at a remote location.

5. The alarm system of claim 1 further comprising a signal for indicating an alarm status.

6. A method, comprising:
reading an alarm key value;
arming an alarm system when the read key value matches a stored key value;
monitoring the amount of motion of a bicycle; and
generating a first alarm when the amount of motion of the bicycle exceeds a threshold amount of motion at a first time within a time period; and
generating a second alarm when the amount of motion of the bicycle exceeds a second threshold amount at a second later time within the time period.

7. The method of claim 6 wherein the first threshold amount corresponds to an amount of motion that equals an amount of motion to which the second threshold amount corresponds.

8. The method of claim 6, further comprising waiting a certain amount of time after the read key value is matched to the stored key value before arming the alarm system.

9. The method of claim 6 wherein generating a first alarm comprises making an audible sound.

10. The method of claim 9 wherein generating a second alarm comprises making a second audible sound that is louder than the first audible sound.

11. The method of claim 6 wherein generating a second alarm comprises sending a wireless signal.

12. The alarm system of claim 4 wherein the signal is selected from the group comprising radio-frequency signals and infrared signals.

13. The alarm system of claim 4 wherein the alarm generator is structured to generate an alarm when the accelerometer indicates an amount of motion above a threshold amount of motion.

14. The method of claim 6 wherein the first threshold amount corresponds to an amount of motion that is less than an amount of motion to which the second threshold amount corresponds.

15. The method of claim 6, the method further comprising:
reading an alarm key value; and
arming the alarm system when the read key value matches one of a plurality of pre-stored authorized key values.

16. The method of claim 15 wherein the alarm system includes a wireless sending unit and wherein the method further comprises indicating an alarm at a remote indicator responsive to receiving a signal from the wireless sending unit at the remote indicator.

17. The method of claim 16 wherein the signal is selected from the group comprising radio-frequency signals and infrared signals.

18. The method of claim 6 wherein the alarm system includes a wireless sending unit and wherein the method further comprises indicating an alarm at a remote indicator responsive to receiving a signal from the wireless sending unit at the remote indicator.

19. The method of claim 18 wherein the signal is selected from the group comprising radio-frequency signals and infrared signals.

20. A method, comprising:
reading an alarm key value associated with a bicycle lock;
arming an alarm system when the read key value matches a stored key value;
monitoring the amount of motion of the bicycle;
generating an alarm signal when the amount of motion of the bicycle exceeds a threshold amount of motion;
transmitting the alarm signal to a remote indicator; and
indicating an alarm condition at the remote indicator in response to a received alarm signal.

21. The method of claim 20 wherein the threshold amount of motion comprises a first threshold amount of motion within a time period and the alarm comprises a first alarm, the method further comprising generating a second more urgent alarm when motion of the bicycle exceeds a second threshold amount of motion within the time period.

22. The method of claim 21, the method further comprising:
reading an alarm key value; and
arming the alarm system when the read key value matches one of a plurality of stored key values.

23. The method of claim 20, the method further comprising:
reading an alarm key value; and
arming the alarm system when the read key value matches one of a plurality of stored key values.

* * * * *